United States Patent
Ayyagari et al.

(10) Patent No.: US 10,324,981 B2
(45) Date of Patent: Jun. 18, 2019

(54) QUALITY ANALYSIS ON OBJECT NOTATION DATA SOURCES

(71) Applicant: International Business Machines Corporation, Armonk, NY (US)

(72) Inventors: Phani Kumar V. U. Ayyagari, Hyderabad (IN); Manish A. Bhide, Hyderabad (IN); Bhavani K. Eshwar, Bangalore (IN); Purnachandra R. Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 14/881,202

(22) Filed: Oct. 13, 2015

(65) Prior Publication Data

US 2017/0102923 A1    Apr. 13, 2017

(51) Int. Cl.
*G06F 7/00*     (2006.01)
*G06F 16/80*    (2019.01)
*G06F 9/455*    (2018.01)

(52) U.S. Cl.
CPC .......... *G06F 16/80* (2019.01); *G06F 9/45504* (2013.01)

(58) Field of Classification Search
USPC .................. 707/769, 791, 792, 803; 717/116
See application file for complete search history.

(56) References Cited

U.S. PATENT DOCUMENTS

| | | | |
|---|---|---|---|
| 9,037,614 B1* | 5/2015 | Parrott | G06F 17/30607 707/803 |
| 9,342,435 B2* | 5/2016 | Van Rozen | G06F 8/41 |
| 2013/0086104 A1* | 4/2013 | Morrison | G06F 17/30557 707/769 |
| 2013/0110879 A1* | 5/2013 | Winternitz | G06F 17/30345 707/792 |
| 2014/0067866 A1* | 3/2014 | Chen | G06F 17/3089 707/791 |
| 2014/0279835 A1 | 9/2014 | Li et al. | |
| 2016/0042015 A1* | 2/2016 | Landau | G06F 17/30292 707/803 |

OTHER PUBLICATIONS

Shukla et al., Proceedings of the VLDB Endowment—Proceedings of the 41st International Conference on Very Large Data Bases, Kohala Coast, Hawaii VLDB Endowment Hompage archive vol. 8 Issue 12, Aug. 2015 pp. 1668-1679.*

(Continued)

*Primary Examiner* — Cheyne D Ly
(74) *Attorney, Agent, or Firm* — David B. Woycechowsky

(57) ABSTRACT

Determination of a degree of similarity among and between a set of text notation schema instances. One type of text notation schema instance is the JSON type. In some embodiments, the degree of similarity is expressed as a schema variance value which is determined by individually comparing the schema instances of the set of text notation schema instances to a representative majority schema. Also, determining a quality of a data source associated with the plurality of text notation schema instances based, at least in part, upon the similarity value.

3 Claims, 2 Drawing Sheets

(56) References Cited

OTHER PUBLICATIONS

Klettke et al., "Schema Extraction and Structural Outlier Detection for JSON-based NoSQL Data Stores", Datenbanksysteme für Business, Technologie und Web (BTW 2015) P-241, pp. 425-444, 2015,Copyright © Gesellschaft für Informatik, Bonn, <http://subs.emis.de/LNI/Proceedings/Proceedings241/article35.html>.

Wang et al., "Schema Management for Document Stores", Proceedings of the VLDB Endowment, vol. 8, No. 9, Copyright 2015 VLDB Endowment, pp. 922-933.

"JSON", Wikipedia, the free encyclopedia, last modified Sep. 1, 2015, 13 pages, <https://en.wikipedia.org/wiki/JSON#JSON_Schema>.

"XML schema", Wikipedia, the free encyclopedia, last modified Jul. 31, 2015, 10 pages, <https://en.wikipedia.org/wiki/XML_schema.

\* cited by examiner

QUALITY ANALYSIS ON OBJECT NOTATION DATA SOURCES

BACKGROUND

The present invention relates generally to the field of object oriented scripting language schemas, and also to determining quality of data sources associated with object oriented scripting language schemas.

Object notation data sources are typically used in connection with scripting for object oriented computer languages, such as Java. (Note: the term(s) "JAVA" may be subject to trademark rights in various jurisdictions throughout the world and are used here only in reference to the products or services properly denominated by the marks to the extent that such trademark rights may exist.) In the context of Java, the object notation used in connection with scripting (that is, Java script) is called JSON (Java script object notation). JSON data sources are typically used in today's world. JSON data is stored in JSON data sources such as open source, commercially-available, non-relational, distributed database services. Data from these data sources is used by various applications for their processing needs. A typical use case is that of mobile applications which consume and process data in JSON format.

An XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints. There are languages developed specifically to express XML schemas. The Document Type Definition (DTD) language, which is native to the XML specification, is a schema language that is of relatively limited capability, but that also has other uses in XML aside from the expression of schemas. Two more expressive XML schema languages in widespread use are XML Schema (with a capital S) and RELAX NG. The mechanism for associating an XML document with a schema varies according to the schema language. The association may be achieved via markup within the XML document itself, or via some external means.

JSON Schema specifies a JSON-based format to define the structure of JSON data for validation, documentation, and interaction control. A JSON Schema provides a contract for the JSON data required by a given application, and how that data can be modified. JSON Schema is based on the concepts from XML Schema (XSD), but is JSON-based. The JSON data schema can be used to validate JSON data. As in XSD, the same serialization/deserialization tools can be used both for the schema and data. The schema is self-describing.

SUMMARY

According to an aspect of the present invention, there is a method, computer program product and/or system that performs the following operations (not necessarily in the following order):

(i) receives a plurality of text notation schema instances;

(ii) determines a degree of similarity of structure and content between at least some of the text notation schema instances of the plurality of text notation schema instances; and (iii) outputting a similarity value based, at least in part, upon the determined degree of similarity.

DETAILED DESCRIPTION

Figure 1:
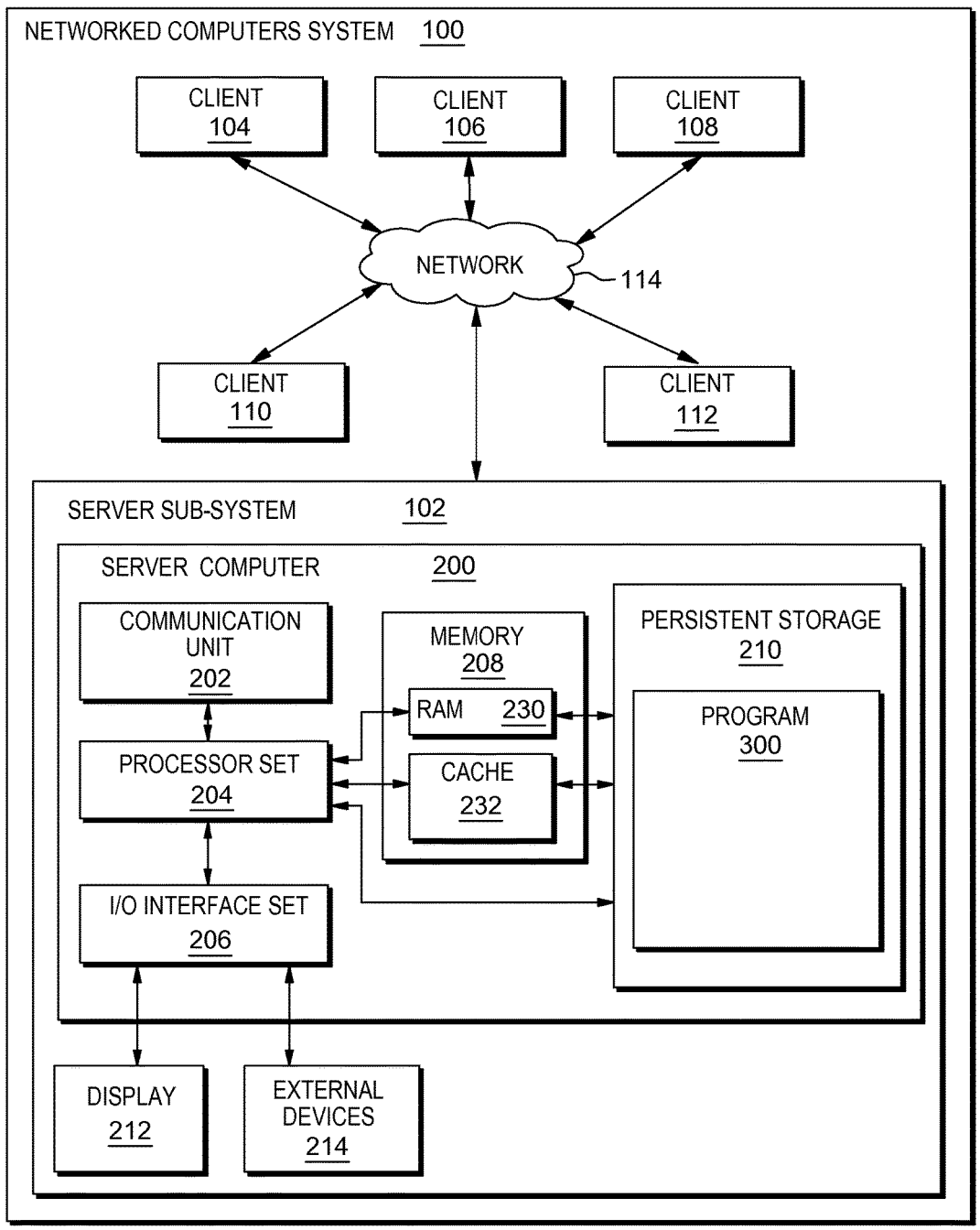
FIG. 1 is a block diagram view of a first embodiment of a system according to the present invention.

Some embodiments of the present disclosure are directed to determining the similarity between a set of "text notation schema instances" (see definition, below). One type of text notation schema instance is the JSON type. In some embodiments, the degree of similarity is expressed as a "schema variance" value which is determined by individually comparing the schema instances of the set of text notation schema instances to a representative "majority schema." This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
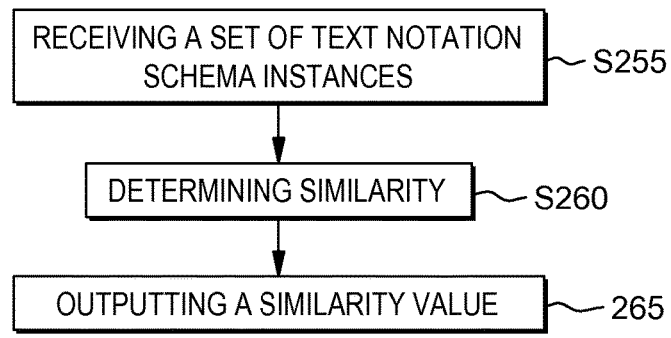
FIG. 2 is a flowchart showing a first embodiment method performed, at least in part, by the first embodiment system.
Figure 3:
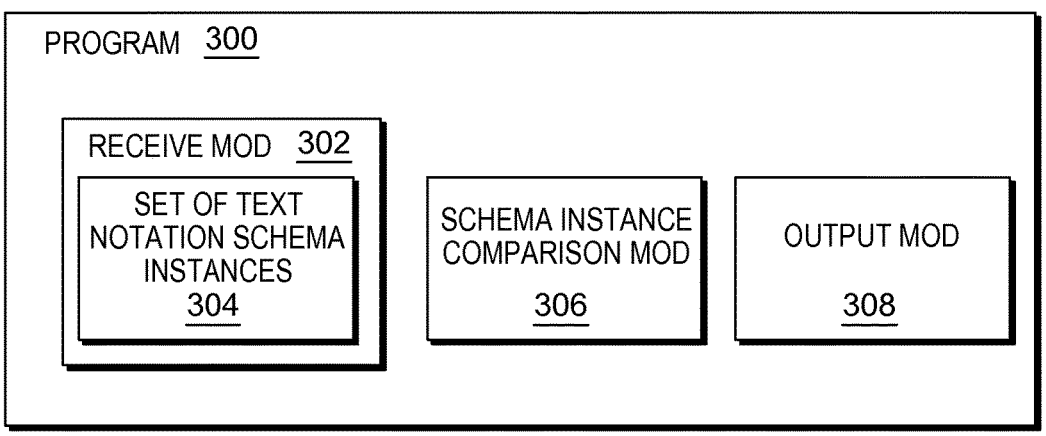
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive module ("mod") 302 receives a set of text notation schema instances 304 from client 104 (see FIG. 1). In this example, the set of text notation schema instances are XML (eXtensible markup language) schema instances (see definition of "text notation schema instance," below).

Processing proceeds to operation S260, where schema instance comparison mod 306 determines similarity between the text notation schema instances of the set of text notation schema instances. More specifically, a degree of similarity, with respect to structure and content of the text notation schema instances, for at least some of the schema instances of the set of text notation schema instances. In this example, all of the text notation schema instances are considered. Alternatively, outliers may be neglected in some embodiments. As a further alternative, some text notation schema instances may be weighed more heavily than others in the determination of aggregate degree of similarity.

In this example, each possible pair of schema instances are compared to each other to determine pair-wise similarity values, which are aggregated to determine the aggregate degree of similarity and associated similarity value. Below, in the Further Comments And/Or Embodiments Sub-Section of this Detailed Description Section, a method for determining a "schema variance" (that is, a specific kind of degree of similarity value) is discussed in detail.

Processing proceeds to operation S265, where output mod 308 outputs a similarity value that reflects the similarity determined at operation S260. In this example, the similarity value is outputted back to client 104 (see FIG. 1). Alternatively, the similarity value could be outputted locally at server sub-system 102 (for example, stored in RAM 230 (see FIG. 1)).

III. FURTHER COMMENTS AND/OR EMBODIMENTS

Some embodiments of the present invention may include one, or more, of the following features, characteristics and/or advantages: (i) perform quality analysis on JSON (Java script object notation) data sources; (ii) a method to find the quality of a JSON data source; (iii) define a metric called "Schema variance;" (iv) provide a technique to efficiently find a Schema variance value for a given JSON data source; (v) leverage the fact that the lesser the schema variance the better the quality of the data source; (vi) choose a best data source with less schema variance; (vii) makes business application development becomes easy; (viii) simplify, parsing, querying and/or managing data is simplified; and/or (ix) providing a schema variance which helps in weighing the quality of a JSON data store.

An example of a method to calculate schema variance (that is, Finding Schema Similarity of Data Source) according to the present disclosure will now be discussed in the following paragraphs.

STEP 1: Finding Majority Schema: A "majority schema" (as that term is used herein) can be thought of as the best possible representative schema for a given JSON store. In this example, the following technique to find the majority schema: (i) all the JSON documents (or a random sample) of the JSON store are scanned; (ii) each schema is hashed using Prufer sequence (Prufer sequence is a technique in combinatorial mathematics which is used to find a unique representation of a tree); (iii) use the element/attribute names of the JSON document to create the Prufer sequence (this helps us to find the representation of a JSON document efficiently); (iv) for each unique Prufer sequence, keep a count of the number of times the sequence has been encountered while scanning a JSON database; (v) find the different Prufer sequences that represent the various JSON documents in the database; and (vi) once the documents have been scanned, the schema occurring maximum number of times is chosen as "majority schema."

STEP 2: Finding Similarity Between Majority Schema and The Rest Of The Schema. In this example, the following technique to find similarity between majority schema and each non-majority schema instance includes the following sub-steps: (i) scan each Prufer sequence; (ii) find the number of nodes in a given type of schema (as represented by the Prufer sequence) that match the majority schema; (iii) make two passes over the various schema types (or over a random sample); and (iv) while scanning each schema type during the first and second pass, the following sub-sub-steps are performed: (a) a first pass to compare the nodes of the two schemas using level order traversal; (b) while scanning each schema type during the first pass, some elements of the schema will not be matched with the corresponding nodes of the majority schema and for such non-matching elements, a second pass is performed; and (c) the second pass matches unmatched fields from one schema with the unmatched fields of the majority schema in other levels starting from a closer level. Further with respect to sub-sub-step (c) of sub-step (iv) of step 2, a count is normalized by the number of nodes in the given schema. If an element of a given schema matches the element of majority schema which is one level above or below, then the count for the number of matching nodes is incremented by $\frac{1}{2}$. Correspondingly, if an element is two levels apart, then the count is increased by $\frac{1}{3}$.

STEP 3: Computing Total Similarity. The following paragraphs will respectively set forth sub-steps of an example technique to compute total similarity according to the embodiment under discussion.

SUB-STEP (i): from the above scans, information is obtained about the number of JSON documents that match the majority schema; (ii) for the rest of the scans, the count is obtained of the number of elements in each JSON document/schema which match with the majority schema; and (iii) use the following formula (Eq. 1) to compute the total similarity:

Under Eq. 1, Total Schema Similarity is equal to the following expression:

$$(\% \text{ MajSchema})/100 - \Sigma(\% \text{ schemaTypeK}/100) * \text{Similarity}(\text{MajSchema}, \text{schemaTypeK})$$

(MajSchema) is the percentage of documents that match the majority schema; (% schemaTypeK) is the percentage of times that the given schema occurs in the database is calculated in Step 1; and Similarity (MajSchema, SchemaTypeK) is calculated in Step 2.

Using Eq. 1, if a JSON database has uniform schema then it will have a similarity score of close to 1. For example, experimental results of this disclosure's schema similarity algorithms show that similarity of Facebook data source is 88%.

Some embodiments of the present invention may include one, or more, of the following features, characteristics and/or advantages: (i) defining the concept of Schema variance which is independent of position of nodes and phonetic variations; (ii) finding the majority schema across all the JSON documents present in the database; (iii) compute the variance of each JSON document with the majority schema independent of the position of the nodes and phonetic variations; (iv) efficiently computing the variance of the JSON data store; (v) provides a method to find the single majority schema (as opposed to multiple unique schemas which would be of no use for finding the schema variance); (vi) the input an algorithm is a JSON data store; (vii) finds the schema variance for the JSON data store; (viii) provides a method to find the schema variance independent of the position and phonetic variance in the JSON attributes; and/or (ix) teaches a method to find the schema variance in O(n) operation which makes it very practical to use.

IV. DEFINITIONS

8 Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Text notation schema instance: any instance of any schema that applies to any text-based notation designed for use with computers, including, but not limited to, the following types of text notation: JSON, XML, HTML, SGML, etc.

What is claimed is:

1. A method comprising:
receiving a plurality of JSON schemas used to store some of the data in a first data store, with each JSON schema of the plurality JSON schemas respectively corresponding to a set of attributes and attribute types for parsing JSON data objects according the respectively corresponding JSON schema;
receiving a first JSON data store data set including information indicative of attribute values, attribute types and attribute organization of first plurality of JSON data objects stored in a first JSON data store;
for each given JSON schema of the plurality of JSON schemas, determining a proportion value corresponding to a proportion of the first plurality of JSON objects that conform to the given JSON schema;
determining a first majority JSON schema as a JSON schema of the first plurality of JSON schemas that has the largest respectively corresponding proportion value;
for each given JSON schema of the plurality of JSON schemas, determining a first similarity score between the given JSON schema and the first majority JSON schema, with: (i) the first similarity score of the first majority JSON schema being one, and (ii) first similarity scores for each given JSON schema other than the first majority JSON schema is based upon a degree of similarity between the given JSON schema and the first majority JSON schema;
for each given JSON schema of the plurality of JSON schemas, determining a product corresponding to the given JSON schema, with the product being a product of: (i) the proportion value of the given JSON schema, multiplied by (ii) the first similarity score of the given JSON schema;
determining a first data store variance value by summing the products respectively corresponding to the JSON schema of the plurality of JSON schemas; and
selecting the first data store to supply data based, at least in part, upon the first data store variance value.

2. A computer program product (CPP) comprising:
a machine readable storage device; and
computer code stored on the machine readable storage device, with the computer code including instructions for causing a processor(s) set to perform operations including the following:
receiving a plurality of JSON schemas used to store some of the data in a first data store, with each JSON schema of the plurality JSON schemas respectively corresponding to a set of attributes and attribute types for parsing JSON data objects according the respectively corresponding JSON schema,
receiving a first JSON data store data set including information indicative of attribute values, attribute types and attribute organization of first plurality of JSON data objects stored in a first JSON data store,
for each given JSON schema of the plurality of JSON schemas, determining a proportion value corresponding to a proportion of the first plurality of JSON objects that conform to the given JSON schema,
determining a first majority JSON schema as a JSON schema of the first plurality of JSON schemas that has the largest respectively corresponding proportion value,
for each given JSON schema of the plurality of JSON schemas, determining a first similarity score between the given JSON schema and the first majority JSON schema, with: (i) the first similarity score of the first majority JSON schema being one, and (ii) first similarity scores for each given JSON schema other than the first majority JSON schema is based upon a degree of similarity between the given JSON schema and the first majority JSON schema,
for each given JSON schema of the plurality of JSON schemas, determining a product corresponding to the given JSON schema, with the product being a product of: (i) the proportion value of the given JSON schema, multiplied by (ii) the first similarity score of the given JSON schema,
determining a first data store variance value by summing the products respectively corresponding to the JSON schema of the plurality of JSON schemas, and
selecting the first data store to supply data based, at least in part, upon the first data store variance value.

3. A computer system (CS) comprising:
a processor(s) set;
a machine readable storage device; and
computer code stored on the machine readable storage device, with the computer code including instructions for causing the processor(s) set to perform operations including the following:
receiving a plurality of JSON schemas used to store some of the data in a first data store, with each JSON schema of the plurality JSON schemas respectively corresponding to a set of attributes and attribute types for parsing JSON data objects according the respectively corresponding JSON schema,
receiving a first JSON data store data set including information indicative of attribute values, attribute types and attribute organization of first plurality of JSON data objects stored in a first JSON data store,
for each given JSON schema of the plurality of JSON schemas, determining a proportion value corresponding to a proportion of the first plurality of JSON objects that conform to the given JSON schema, determining a first majority JSON schema as a JSON schema of the first plurality of JSON schemas that has the largest respectively corresponding proportion value, for each given JSON schema of the plurality of JSON schemas, determining a first similarity score between the given JSON schema and the first majority JSON schema, with: (i) the first similarity score of the first majority JSON schema being one, and (ii) first similarity scores for each given JSON schema other than the first majority JSON schema is based upon a degree of similarity between the given JSON schema and the first majority JSON schema, for each given JSON schema of the plurality of JSON schemas, determining a product corresponding to the given JSON schema, with the product being a product of: (i) the proportion value of the given JSON schema, multiplied by (ii) the first similarity score of the given JSON schema, determining a first data store variance value by summing the products respectively corresponding to the JSON schema of the plurality of JSON schemas, and selecting the first data store to supply data based, at least in part, upon the first data store variance value.

\* \* \* \* \*